United States Patent
Hansen et al.

(10) Patent No.: US 11,137,014 B2
(45) Date of Patent: Oct. 5, 2021

(54) CONDUCTIVE FASTENING SYSTEM AND METHOD FOR IMPROVED EME PERFORMANCE

(71) Applicant: The Boeing Company, Chicago, IL (US)

(72) Inventors: Darrin M. Hansen, Seattle, WA (US); Blake A. Simpson, Kent, WA (US); Shahriar Khosravani, Everett, WA (US)

(73) Assignee: The Boeing Company, Chicago, IL (US)

( * ) Notice: Subject to any disclaimer, the term of this patent is extended or adjusted under 35 U.S.C. 154(b) by 253 days.

(21) Appl. No.: 16/242,115

(22) Filed: Jan. 8, 2019

(65) Prior Publication Data

US 2020/0217349 A1   Jul. 9, 2020

(51) Int. Cl.
*H05F 3/00* (2006.01)
*F16B 33/00* (2006.01)
(Continued)

(52) U.S. Cl.
CPC ............ *F16B 33/004* (2013.01); *F16B 33/06* (2013.01); *B64D 45/02* (2013.01)

(58) Field of Classification Search
CPC .................. F16B 33/004; F16B 33/06; F16B 2001/0064; F16B 5/02
(Continued)

(56) References Cited

U.S. PATENT DOCUMENTS 3,396,996 A   8/1968   Raptis
3,630,253 A   12/1971   Sherman
(Continued)

FOREIGN PATENT DOCUMENTS

CN   105158572 A   12/2015
EP   0685389 A1   12/1995
(Continued)

OTHER PUBLICATIONS

Advisory Circular, "Protection of Aircraft Electrical/Electronic Systems Against the Indirect Effects of Lightning," US Department of Transportation, Federal Aviation Administration, Dec. 21, 2006, AC No. 20-136A, 29 pgs.
(Continued)

*Primary Examiner* — Jared Fureman
*Assistant Examiner* — Lucy M Thomas
(74) *Attorney, Agent, or Firm* — Ostrager Chong Flaherty & Broitman P.C.

(57) ABSTRACT

A conductive fastening system, a fastened assembly, and a method of fastening an assembly composed of layers of carbon fiber reinforced plastic ("CFRP") and/or metallic material includes fasteners with an electrically conductive coating and electrically conductive gap filler materials between the fasteners and sidewalls of holes formed through the layers of the assembly. The sidewalls of the holes are coated with the electrically conductive gap filler material by abrading, injection or spraying. The fasteners with the electrically conductive coating are inserted through the holes. The conductive coating on the fasteners and electrically conductive gap filler material work together to enhance electrical conductivity between the fastener and assembly. The conductive coating also acts as a lubricant to reduce the amount of force required to insert the fastener into the hole thereby reducing damage to the assembly.

20 Claims, 3 Drawing Sheets

(51) Int. Cl.
*F16B 33/06* (2006.01)
*B64D 45/02* (2006.01)

(58) Field of Classification Search
USPC ........................................................ 361/216
See application file for complete search history.

(56) References Cited

U.S. PATENT DOCUMENTS

| | | | |
|---|---|---|---|
| 3,894,466 A | 7/1975 | Wibrow | |
| 3,962,775 A | 6/1976 | King, Jr. | |
| 3,983,304 A | 9/1976 | Sekhon | |
| 3,987,714 A | 10/1976 | Campbell | |
| 4,054,045 A | 10/1977 | King, Jr. | |
| 4,074,011 A | 2/1978 | Teramae et al. | |
| 4,281,044 A | 7/1981 | Walters et al. | |
| 4,755,904 A | 7/1988 | Brick | |
| 5,018,920 A | 5/1991 | Speakman | |
| 5,221,170 A | 6/1993 | Duffy et al. | |
| 5,685,680 A | 11/1997 | Duffy et al. | |
| 5,785,478 A | 7/1998 | Rotter | |
| 5,789,085 A | 8/1998 | Blohowiak et al. | |
| 5,814,137 A | 9/1998 | Blohowiak et al. | |
| 5,849,110 A | 12/1998 | Blohowiak et al. | |
| 5,869,140 A | 2/1999 | Blohowaik et al. | |
| 5,939,197 A | 8/1999 | Blohowiak et al. | |
| 6,007,286 A | 12/1999 | Toyota et al. | |
| 6,025,081 A | 2/2000 | Ohshiro et al. | |
| 6,037,060 A | 3/2000 | Blohowiak et al. | |
| 6,129,996 A | 10/2000 | Cordy | |
| 6,171,649 B1 | 1/2001 | Keener et al. | |
| 6,190,102 B1 | 2/2001 | Vignotto et al. | |
| 6,599,071 B1 | 7/2003 | McCauley et al. | |
| 6,729,531 B2 | 5/2004 | Stevenson et al. | |
| 6,953,509 B2 | 10/2005 | Keener et al. | |
| 7,465,234 B2 | 12/2008 | Keener et al. | |
| 7,599,164 B2 | 10/2009 | Heeter et al. | |
| 7,655,320 B2 | 2/2010 | Keener et al. | |
| 7,678,997 B2 | 3/2010 | Rawlings | |
| 7,695,226 B2 | 4/2010 | March et al. | |
| 7,755,876 B2 | 7/2010 | Morrill et al. | |
| 7,835,130 B2 | 11/2010 | Ware et al. | |
| 7,842,403 B2 | 11/2010 | Meyer, Jr. et al. | |
| 7,867,621 B2 | 1/2011 | Rawlings et al. | |
| 7,887,268 B2 | 2/2011 | Mathis | |
| 7,976,258 B2 | 7/2011 | Asai et al. | |
| 8,715,824 B2 | 5/2014 | Rawlings et al. | |
| 9,276,391 B2 | 3/2016 | Hasenoehrl et al. | |
| 9,447,809 B2 | 9/2016 | Regnard et al. | |
| 9,488,609 B2 | 11/2016 | Khosravani | |
| 9,586,699 B1 * | 3/2017 | Vail, III | B29C 73/10 |
| 9,593,706 B2 | 3/2017 | Bickford et al. | |
| 2003/0219328 A1 | 11/2003 | Schultz | |
| 2005/0226701 A1 | 10/2005 | Craven | |
| 2008/0075555 A1 | 3/2008 | March et al. | |
| 2008/0307886 A1 | 12/2008 | Marsh et al. | |
| 2009/0073548 A1 | 3/2009 | Youngs | |
| 2010/0010794 A1 | 1/2010 | Sweers | |
| 2010/0215358 A1 | 8/2010 | Harres et al. | |
| 2010/0027051 A1 | 10/2010 | Haylock et al. | |
| 2010/0270513 A1 | 10/2010 | Haylock et al. | |
| 2010/0272537 A1 | 10/2010 | Haylock et al. | |
| 2011/0014356 A1 | 1/2011 | Fornes et al. | |
| 2011/0036621 A1 | 2/2011 | Kobayashi et al. | |
| 2011/0142567 A1 | 6/2011 | Haylock et al. | |
| 2012/0070249 A1 | 3/2012 | Meyer et al. | |
| 2012/0119761 A1 | 5/2012 | Pons et al. | |
| 2012/0201999 A1 | 8/2012 | Woods et al. | |
| 2013/0099490 A1 | 4/2013 | Kwon et al. | |
| 2013/0330145 A1 | 12/2013 | Cloud | |
| 2014/0055906 A1 | 2/2014 | Whitlock | |
| 2014/0130335 A1 | 5/2014 | Bickford | |
| 2015/0147136 A1 | 5/2015 | Maurel et al. | |
| 2015/0212136 A1 | 7/2015 | Iwaki et al. | |
| 2015/0219577 A1 | 8/2015 | Khosravani | |
| 2015/0337885 A1 * | 11/2015 | Whitlock | F16B 35/048 411/411 |
| 2016/0018459 A1 | 1/2016 | Ohtsuka et al. | |
| 2016/0169262 A1 | 6/2016 | Regnard et al. | |
| 2016/0169945 A1 * | 6/2016 | Mauder | G01R 31/3274 324/126 |
| 2016/0229552 A1 | 8/2016 | Gross et al. | |
| 2016/0297542 A1 | 10/2016 | Khosravani et al. | |
| 2016/0369781 A1 | 12/2016 | March Nomen et al. | |
| 2018/0074036 A1 | 3/2018 | Boettcher et al. | |

FOREIGN PATENT DOCUMENTS

| | | |
|---|---|---|
| EP | 1903221 A2 | 3/2008 |
| EP | 2406336 A1 | 1/2012 |
| EP | 2905610 A1 | 8/2015 |
| FR | 2672091 A1 | 7/1992 |
| FR | 3026446 A1 | 4/2016 |
| GB | 2212580 A | 7/1989 |
| JP | 3596563 B2 | 12/2004 |
| WO | 02082468 A1 | 10/2002 |
| WO | 2009052325 A1 | 4/2009 |
| WO | 2011050040 A1 | 4/2011 |
| WO | 2011131995 A1 | 10/2011 |
| WO | 2016050791 A1 | 4/2016 |

OTHER PUBLICATIONS

Extended European Search Report dated Jul. 2, 2018 in European Patent Application No. 17204423.2.
Extended European Search Report dated Jul. 30, 2018 in European Patent Application No. 18151915.8.
Evans, Simon et al., "Lighting Strike Protection of Aircraft Structural Joints," 2014 International Conference on Lighting Protection (ICLP), Shanghai, China, 2014, pp. 1952-1959.
Rupke, Ed, "Lighting Direct Effects Handbook," AGATE—Advanced General Aviation Transportation Experiments, Mar. 1, 2002, Report Reference No. AGATE-WP3.1-031027-043—Design Guideline work Package Title: WBS3.0 Integrated Design and Manufacturing, 119 pgs.
Duan et al., Lighting Direct Effect Experimental research on Rotor Blade of a Helicopter, 2015.
Extended European Search Report dated Oct. 2, 2015 in European Patent Application No. 15163457.3.
Extended European Search Report dated Mar. 1, 2018 in European Patent Application No. 17206395.0.

* cited by examiner

FIG.2

CONDUCTIVE FASTENING SYSTEM AND METHOD FOR IMPROVED EME PERFORMANCE

TECHNICAL FIELD

This disclosure relates to a conductive fastening system and method for enhancing electrical conductivity of a structural joint assembly having a metallic fastener that is inserted through a hole in two or more structural elements, at least one of which is made of a composite material, such as carbon fiber reinforced plastic ("CFRP") to secure the structural elements together and, maximize connectivity between carbon fiber in the CFRP and the fastener for improved conductivity and electromagnetic effect (EME) performance.

BACKGROUND

Lightweight composite materials, such as CFRP, are employed for major structures in aircraft on a regular basis. Composite materials provide a significant improvement in specific strength and stiffness over conventional metal alloys. Better specific strength and stiffness translates into weight savings, resulting in fuel savings and lower operating costs. Additionally, composites are more resistant to corrosion and fatigue over conventional metal alloys. CFRP comprises a matrix material, often a resin, and a fiber material such as carbon fiber. Structural elements in the form of layers of CFRP and/or metallic material are laid down over each other to form a stack-up or stack. The layers in the stack are secured together with metallic fasteners inserted through holes formed through the structural elements. Fasteners generally include a bolt or pin and a mating part such as a nut or a collar.

Metallic fasteners are electrically conductive. This creates EME design considerations for lightning strike and other EME issues since electric currents can travel through structural joints via fasteners. Structural elements in contact with the fastener provide the pathways for current mobility. However, CFRP has lower conductivity than traditional metal alloys because generally only the carbon fibers are electrically conductive. Also, drilling holes in CFRP creates crevices and peaks that form an irregular surface in the sidewalls of CFRP material surrounding the holes. These crevices and the rough surfaces of the fastener can create gaps between the surface of the metallic fastener and that of the CFRP. When lightning strikes a CFRP structure with metallic fasteners, a significant portion of the current may pass into nearby structures through the fasteners. Poor carbon fiber connectivity between the CFRP and the fastener shunts current flow and increases current density, which can give rise to heat and thermal decomposition of surrounding material and cause hot particle ejection (HPE). Thus, fastener sparking modes must be designed for lightning conditions including HPE and arcing between an outer surface of the fastener head and other structure.

Existing solutions use thin sleeved fasteners and tapered sleeve bolts in an interference fit condition to provide an acceptable level of fastener and carbon fiber contact. These are complicated and expensive fastening systems relative to standard fasteners (e.g. HI-LOK™ fasteners and lock bolts) and diminish structural joint efficiency (e.g. sleeves crack in joint fatigue). Other solutions, such as applying stripes of lubricant to longitudinal sections of the fastener, are less expensive but damage the CFRP joint when installed in a high level of interference in order to ensure contact between the fibers. Also, sleeved fasteners are not suitable for use in thick stacks composed of layers of CFRP and metallic material. However, using fasteners without sleeves in an interference fit will gall with the metallic layer and require unacceptably high push-in forces to overcome.

It is therefore desirable to provide a fastening system suitable for composite structures which overcomes EME issues and provides installation and maintenance efficiencies.

BRIEF DESCRIPTION

A conductive fastening system is disclosed herein for EME protection of composite structures wherein a hole is identified in an assembly composed of layers of CFRP and/or metallic material for the installation of a fastener. A fastener diameter is established, and a dimension of the fastener is configured for either a clearance fit, a transition fit, or an interference fit in the hole. An electrically conductive coating ("conductive coating") is applied to the fastener to aid lubricity and prevent galling without impeding EME performance. An electrically conductive gap filler ("CGF") is applied to the hole to fill any crevices in a sidewall of the hole to create a smooth and conductive surface. The fastener is then inserted into the hole. The conductive coating and CGF work together to create an intimate contact between the fastener and CFRP layers to enhance electrical conductivity and more effectively transfer electrical energy during an EME event.

In one aspect of the disclosure, a fastening system is provided for an assembly comprising a first structural element made of a CFRP having a first hole and a second structural element, made of CFRP or a metal, having a second hole aligned with the first hole of the first structural element for insertion of a fastener. The fastening system includes a fastener having a head, a mating portion, and a shank extending between the head and the mating portion. At least the mating portion and the shank of the fastener are insertable into the first hole and the second hole for assembling the first and second structural elements together. An electrically conductive coating is formed on the shank of the fastener and a CGF is applied to a sidewall of at least the first hole in the first structural element.

The electrically conductive coating is preferably made from a conductive metal such as tin, zinc, indium, combinations thereof, or alloys thereof, and is formed on the surface of the shank of the fastener to a thickness of about 0.0001 inch to about 0.0006 inch. In some embodiments, a lubricating coating may be formed over the electrically conductive coating to a thickness of less than about 0.0002 inch to make installing the fastener more efficient.

The CGF is an electrically conductive element such as nickel, zinc, or graphite, and is preferably a low melting alloy (LMA) comprising one or more metals selected from the group consisting of bismuth, indium, tin, nickel, zinc, or combinations thereof. The LMA has a first melting temperature, preferably in the range of about 140° F. to 400° F., that is lower than a second melting temperature of a matrix material of the CFRP. The CGF is applied to a sidewall of a hole formed through the CFRP, which may have an irregular surface. The CGF, when applied, flattens out the irregular surface to improve electrical conductivity.

In another aspect of the disclosure, an assembly comprises a first structural element made of a CFRP having a first hole, a second structural element having a second hole aligned with the first hole of the first structural element, and a fastener comprising a head, a mating portion, and a shank extending between the head and the mating portion. The shank occupies at least respective portions of the first hole in the first structural element and the second hole in the second structural element and the mating portion extends beyond the second structural element. An electrically conductive coating is formed on the shank of the fastener and a CGF is positioned between the shank of the fastener and a sidewall of the first hole in the first structural element.

In yet another aspect of the disclosure, a method for fastening a first structural element made of CFRP having a first hole and a second structural element having a second hole aligned with the first hole is disclosed. In the method, an electrically conductive coating is applied on a shank positioned between a head and a mating portion of the fastener to a thickness of about 0.0001 inch to about 0.0006 inch. A CGF is applied on a sidewall of the first hole in the first structural element to create a soft, lubricious interface for installation of the fastener. If the surface of the sidewall is irregular, the conductive gap filler flattens the jagged edges in the surface of the sidewall. The CGF is applied at a eutectic melt temperature of the low melting alloy or mechanically abraded onto the surface of the sidewall of the first hole at room temperature. At least the mating portion and the shank of the fastener are inserted into the first hole of the first structural element and the second hole of the second structural element such that the shank occupies at least respective portions of the first hole and the second hole and the mating portion extends beyond the second structural element. The features, functions, and advantages that have been discussed, as well as other objects, features, functions, and advantages of the conductive fastening system disclosed herein can be achieved independently in various examples of the disclosure or may be combined in yet other examples further details of which can be seen with reference to the following description and drawings.

DETAILED DESCRIPTION

Figure 1:
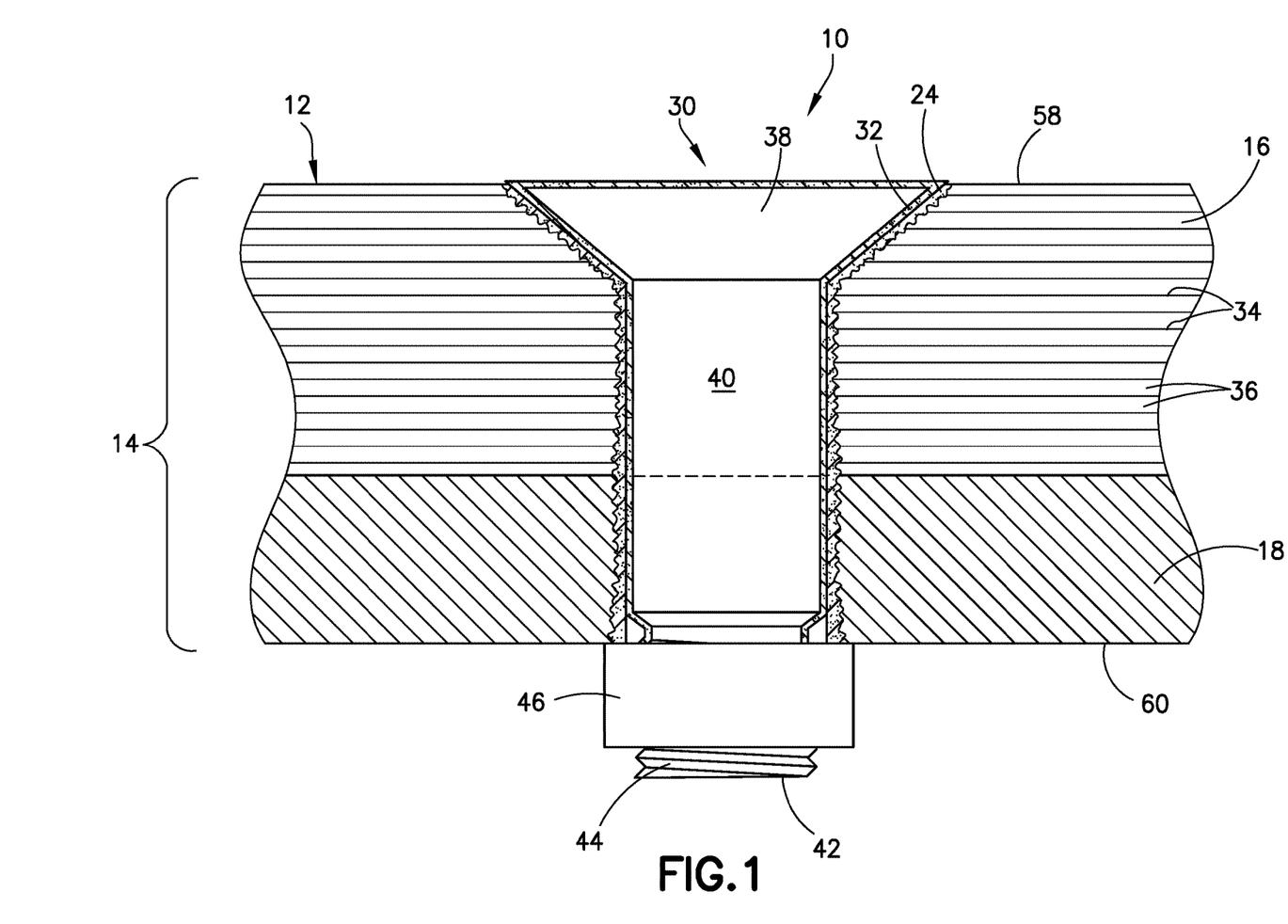
FIG. 1 is a cross-sectional view of a conductive fastening system and an assembly fastened by the conductive fastening system in accordance with this disclosure.

Referring to FIG. 1, the implementations described herein include a conductive fastening system 10 and a method for fastening a structural assembly 12 in the form of a stack 14 of at least a first structural element 16 and a second structural element 18. The first structural element 16 comprises one or more layers of CFRP. The second structural element 18 comprises one or more layers of CFRP and/or a metallic material including, but not limited to, aluminum, titanium, or alloys thereof. A structural assembly 12 having additional structural elements may also be formed using the conductive fastening system 10 disclosed herein. Such a structural assembly 12 is often referred to as a CFRP stack or CFRP-metallic hybrid stacks and has wide application across a broad range of industries including but not limited to forming aircraft structures such as side-of-body joints, wing joints, fuselage joints, major fittings, and other applications. The disclosure herein shall not be limited to aircraft structures or any particular application.

A first hole portion 48 and a second hole portion 50 (more clearly shown in FIG. 3) are drilled, reamed or formed respectively through the first structural element 16 and the second structural element 18 and aligned to form a hole 20 through the assembly 12 with a sidewall 22 formed around the hole 20. The sidewall 22 of the hole 20 in the area of one or more layers of CFRP in the first structural element 16 and/or the second structural element 18 may have an irregular surface with crevices 26 and jagged edges 28. The sidewall 22 is coated with electrically conductive gap filler (CGF) 24 by abrading, injection or spraying the CGF 24 onto the sidewall 22, the CGF 24 substantially filling any crevices 26 formed by the jagged edges 28 in the sidewall 22 of the CFRP layers in the first structural element 16 and the second structural element 18, thereby providing sidewall 22 with a smoother, flatter, conductive surface. While the drawings and the description thereof refer to a single hole 20 through the structural assembly 12, it should be understood that a structural assembly 12 may include a plurality of holes 20 depending on the size and shape of the structural assembly 12 and the desired level of fastening for a particular application.

A fastener 30 having a conductive coating 32 is inserted through each hole 20 to secure the first structural element 16 and the second structural element 18 together. The conductive coating 32 and CGF 24 work together to provide a continuous electrical connection between the fastener 30, the conductive coating 32 on the fastener 30, and carbon fibers 34 in the CFRP layers of the first structural element 16 and second structural element 18 to enhance electrical conductivity and provide improved EME performance. The conductive coating 32 prevents galling during insertion of the fastener 30. The conductive coating 32 also aids lubricity by providing a lubricious surface to reduce the amount of force required to insert the fastener 30 into the holes 20 thereby providing manufacturing efficiencies and reducing the chance of damaging the structural assembly 12 during insertion of the fastener 30 while at the same time not impeding or degrading EME performance.

Conductive Coating 32

Figure 2:
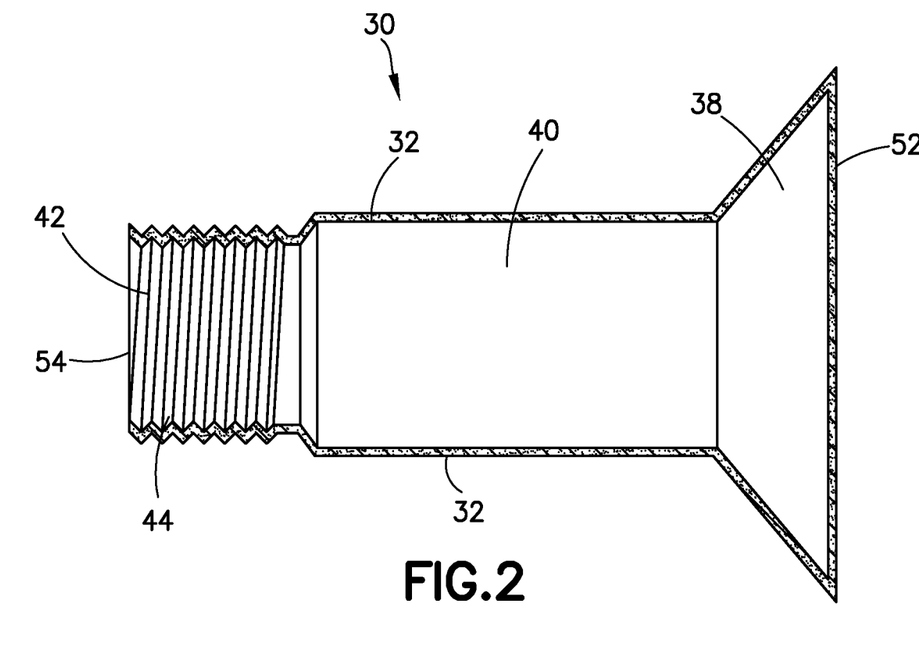
FIG. 2 is a cross-sectional view of a fastener for use with the fastening system shown in FIG. 1.

FIG. 2 shows an exemplary, fastener 30 suitable for use with the conductive fastening system 10. The fastener 30 has a shank 40 with a threaded mating portion 42 at a first end 52 of the fastener 30 and a head 38 at a second end 54 of the fastener 30. The fastener 30 is constructed from metallic materials including but not limited to titanium, stainless steel, aluminum, and combinations or alloys thereof. A mating part 46 having an internal thread (not shown) mates with the threaded mating portion 42 of the fastener 30 as shown in FIG. 1 to secure the first structural element 16 and the second structural element 18 together. As used herein, the term "fastener" 30 includes but is not limited to any type of bolts, pins, rivets, and/or any other suitable devices for fastening structural elements together; and the term "mating part" 46 includes internally threaded nuts or collars and swaged collars that are capable of mating with a fastener 30. Referring to FIG. 2, the fastener 30 is shown as a bolt and the mating part 46 comprises a threaded nut that is engaged with the external screw threads 44 that form the mating portion 42 of the fastener 30. However, the concepts disclosed herein also have application in other embodiments in which the fastener 30 comprises a pin and the mating part 46 comprises a collar that is engaged with the mating portion 42 of the pin.

The dimensions of the fastener 30 will vary depending on the thicknesses of the first structural element 16 and the second structural element 18, the diameter of the hole 20 in the structural assembly 12, and whether the fastener 30 will be inserted into the hole 20 using a clearance fit, a transition fit, or an interference fit. FIG. 2 shows a fastener 30 having a shank 40 with a right circular cylindrical shape. In an alternate embodiment (not shown), a portion of the shank 40 immediately adjacent to the mating portion 42 forms a tapered lead-in section that tapers gradually in a linear taper toward the mating portion 42 with a taper angle equal to or less than 20 degrees. This linearly tapered lead-in geometry decreases installation forces in interference fit holes, thereby increasing joint fatigue life, enhancing fluid tightness, and reducing susceptibility to electromagnetic effects. A linearly tapered lead-in geometry accomplishes the foregoing by promoting gradual compression of material as the shank 40 is pushed through the first structural element 16 and the second structural element 18.

The conductive coating 32 is applied to the fastener 30 to a uniform thickness such that the conductive coating 32 completely surround the fastener 30 (i.e., the fastener 30 is encapsulated by the conductive coating 32). Alternatively, the conductive coating 32 is formed on less than the entire fastener 30 (e.g. only on the shank 40 of the fastener 30). The thickness of the conductive coating 32 may be in the range of about 0.0001 inch to about 0.0006 inch and will be determined based on numerous factors such as the coating composition, and the size and geometry of the structural assembly 12, and the desired application for the structural assembly 12. The conductive coating 32 enhances electrical conductivity, provides lubricity, and helps to mitigate corrosion by providing a sacrificial layer in a manner analogous to cadmium plating.

The conductive coating 32 has a melting temperature that is greater than a maximum temperature expected to be experienced by the CFRP in the structural assembly 12 during use, e.g., operation of an aircraft, and during a finish curing process. Thus, the conductive coating 32 will not melt or soften during use or during a final curing process of the CFRP. The conductive coating 32 is made from one or more of tin, zinc, indium, bismuth, or combinations and alloys thereof. One example is a conductive coating 32 composed of about 100% indium or substantially composed of indium. Another example is a tin-zinc-bismuth alloy made up of approximately 65% tin and approximately 32-33% zinc, with the remainder bismuth is a suitable conductive coating 32. The tin-zinc alloy is a standard cadmium replacement coating that is known in the art. Bismuth is a preferred component because it has been shown to be non-reactive with both titanium and CFRP, which facilitates extending the service lifetime of the fastener 30. Additionally, bismuth has a melting temperature greater than 180 degrees Fahrenheit and will not melt or soften during typical uses of the structural assembly 12 during use, e.g., operation of an aircraft, or during a final curing process of the CFRP. In tin-based coatings, bismuth also helps with the prevention or retardation of tin pest, a low temperature transformation of tin into a brittle phase. Solid additives may be added to the conductive coating 32 such as PTFE or boron nitride that aid in lubricity in structural assemblies 12 that contain CFRP. The tin-zinc-bismuth alloy is soft, providing low shear resistance to facilitate insertion of the shank 40 of the fastener 30 into an interference fit hole 20. The tin-zinc-bismuth alloy is also highly conductive and provides intimate electrical contact between the fastener 30 and the sidewall 22 of the hole 20. The conductive coating 32 may alternatively be composed of a tin bismuth alloy (without any zinc), or alloys based on indium such as tin-indium or zinc-indium, which are soft and galvanically compatible with aluminum.

The conductive coating 32 may be applied to the fastener 30 using any conventional method such as vacuum deposition, electroplating, or thermal spray processing. In one implementation, the conductive coating 32 is applied as a liquid sprayed onto the fastener 30. Alternatively, the conductive coating 32 may be applied by dipping the fastener 30 into a liquid volume of conductive coating 32. Multiple applications of conductive coating 32 may be applied to the fastener 30 in order for the conductive coating 32 to reach a desired thickness. For example, the fastener 30 may be repeatedly dipped into a liquid volume of conductive coating 32 in order to build up a coating that has a desired thickness that is substantially uniform along the length of the shank 40. Although alternative methods for applying the conductive coating 32 are described herein as applying to a single fastener 30, it is considered that tens or hundreds of fasteners 30 can have a conductive coating 32 applied thereto simultaneously. The conductive coating 32 may also receive a conversion treatment (e.g. phosphate conversion or chromate conversion) on all or only a part of the fastener 30 (for example applied only to the head 38 of the fastener 30) to facilitate adhesion of paint. Alternatively, instead of a conversion treatment, a sol-gel treatment may be applied on all or only a part of the fastener 30 prior to the painting. The term "sol-gel", a contraction of solution-gelation, refers to a series of reactions where a soluble metal species (typically a metal alkoxide or metal salt) hydrolyzes to form a metal hydroxide. In addition, a lubricating coating consisting of a lubricant such as cetyl alcohol may also be applied over the conductive coating to a thickness of less than about 0.0002 inch, and preferably less than about 0.0001 inch.

In the disclosed example, the fastener 30 is a sleeveless type of fastener 30. Other types of fasteners 30 may also be used with the conductive fastening system 10. For example, blind fasteners, also commonly known as one-sided-installation fasteners, are another type of fastener 30 suitable for use with the conductive fastening system 10. Blind fasteners include a core bolt and a sleeve, wherein both the core bolt and the sleeve are inserted into a hole 20 in a structural assembly 12 and engage the structural assembly 12 from just one side of the structural assembly 12, without the need for accessing the opposite side of the structural assembly 12. Therefore, blind fasteners are particularly suitable for use in applications where access to one side of a structural assembly 12 is difficult or unavailable. Blind fasteners are constructed from metallic materials including but not limited to titanium, stainless steel, aluminum, and combinations or alloys thereof. The conductive coating 32 may be applied to either the core bolt, the sleeve, or to both in the same manner as described above with respect to non-blind fasteners 30. The conductive coating 32 may be applied to the interior or exterior surface of the sleeve or to both surface and may cover the entire sleeve or less than the entire sleeve.

Before applying the conductive coating 32 on the fastener 30, an adhesion layer (not shown) may be deposited on the fastener 30 to increase the adhesion of the conductive coating 32 to the fastener 30. For example, a nickel strike can be employed as the adhesion layer, or a copper or an iron strike may be used. The adhesion layer may be applied by a vacuum deposition process, by electrodeposition, or by any other process known in the art that is suitable for applying an adhesion layer.

Stack 14

Figure 3:
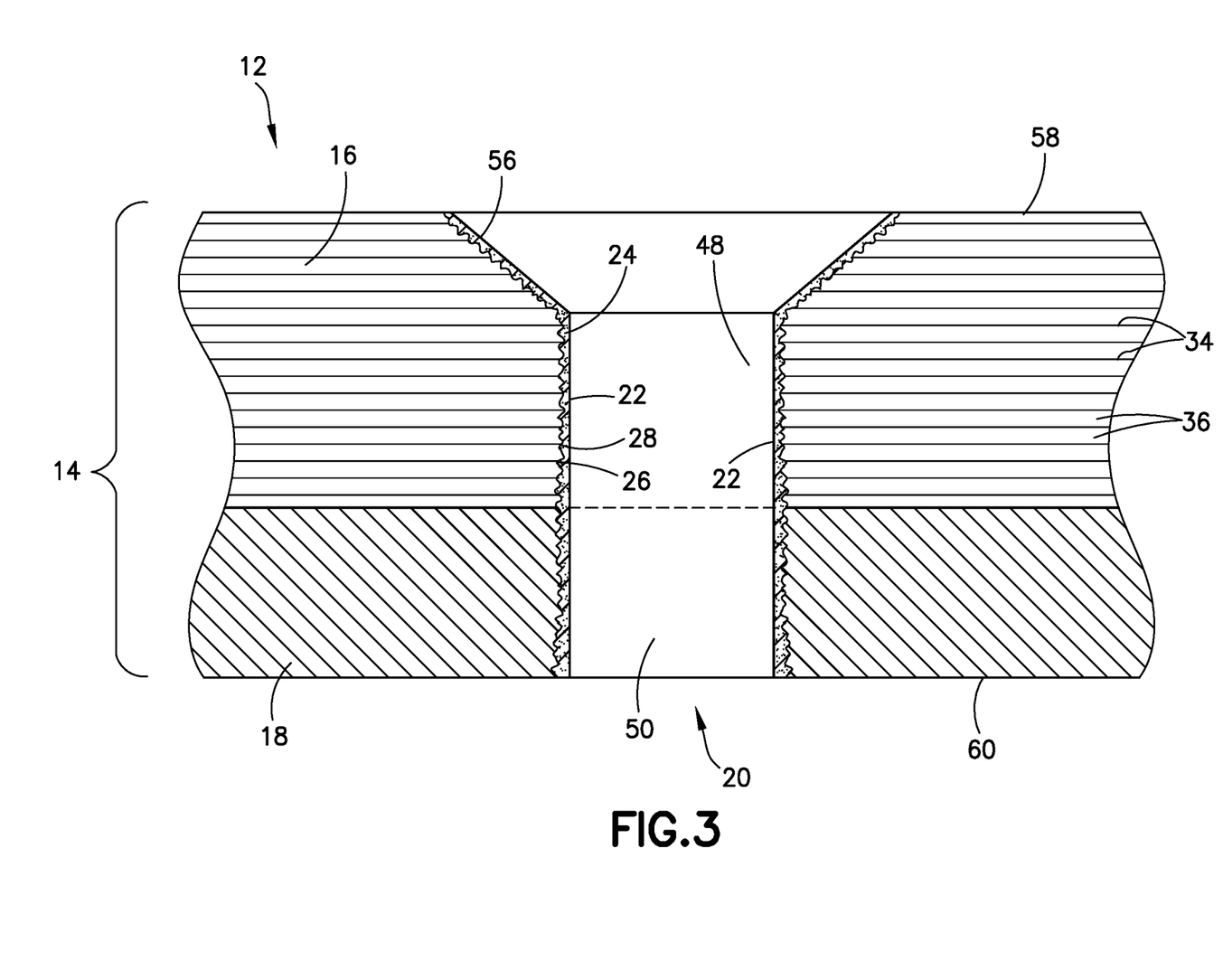
FIG. 3 is a cross-sectional view of the assembly shown in FIG. 1 prior to fastening with the conductive fastening system.

Referring to FIG. 3, the structural assembly 12 is in the form of a stack 14 of two or more structural elements. The first structural element 16, which typically forms an outward facing surface, is a composite material such as CFRP having a matrix material 36 and a plurality of carbon fibers 34 positioned to extend through matrix material 36. The conductive fastening system 10 may also be use with other types of composite materials having an electrically conductive component. In one implementation, the matrix material 36 is formed from one of a thermoplastic resin, such as polypropylene, polyethylene and nylon, or a thermosetting resin such as an epoxy. The carbon fibers 34 in the CFRP may be replaced with any type of electrically conductive material or other electrically conductive composite materials may be used having electrically conductive particles dispersed throughout a matrix material 36. The second structural element 18 may be a composite material such as CFRP or a metallic material, such as aluminum, titanium or alloys thereof, or other material suitable for a desired application of the structural assembly 12. In the disclosed example, the structural assembly 12 includes a stack 14 of two structural elements. It should be understood that the first structural element 16 and the second structural element 18 can each be formed from one or more layers of CFRP and/or metallic material.

At least one hole 20 is provided through the structural assembly 12 as shown in FIGS. 1 and 3. The hole 20 may be drilled or reamed through the structural assembly 12 after the first structural element 16 and the second structural element 18 have been stacked or layered together. Alternatively, a first hole portion 48 may be pre-formed, drilled or reamed through the first structural element 16 and a second hole portion 50 may be pre-formed, drilled or reamed through the second structural element 18 before these structural elements are stacked or layered together. When the first structural element 16 is stacked or layered with the second structural element 18, the first hole portion 48 is aligned with the second hole portion 50 to form the hole 20 through the structural assembly 12. The hole 20 is defined by a sidewall 22, which has a smooth surface in an area where the second structural element 18 comprises a metallic material, and an irregular surface with crevices 26 and jagged edges 28 in an area where the first structural element 16 or the second structural element 18 comprises CFRP.

The diameter of the hole 20 depends on numerous factors such as the composition of the conductive coating 32 and CGF 24 used, the thickness of the structural assembly 12, the size and geometry of the fastener 30, whether the fastener 30 will be inserted into the hole 20 using a clearance fit, a transition fit, or an interference fit, and other design specific considerations. For example, in a clearance fit, the diameter of holes 206, 208 may be dimensioned to have a clearance of about 0.0005 inch to about 0.004 inch, preferably about 0.002 inch to about 0.003 inch, while in an interference fit, holes 206, 208 may be dimensioned to have an interference of about 0.00 inch to about 0.005 inch, preferably 0.0025 to 0.003 inch. In the drawings, a top portion 56 of the sidewall 22 of the hole 20 (particularly the top of the first hole portion 48) is tapered in an outward direction from the hole 20 to allow the head 38 of the fastener 30 to be countersunk into a top surface 58 of the first structural element 16. The taper in the top portion 56 can be straight or curved depending on the shape of the head 38 of the fastener 30. Alternatively, hole 20 can have a straight sidewall 22 with no taper and the head 38 of the fastener 30 rests on top of the top surface 58 of the first structural element 16.

Electrically Conductive Gap Filler (CGF) 24

In the disclosed conductive fastening system 10, the hole 20 in the structural assembly 12 is coated with CGF 24. After the fastener 30 with the conductive coating 32 has been inserted into the hole 20 coated with CGF 24, the CGF 24 enhances the electrical conductivity between the carbon fibers 34 of the CFRP and the fastener 30 while minimizing the variation in interference fit for fasteners 30. A layer of CGF 24 may be applied to the sidewall 22 of the entire hole 20. Alternatively, in structural assemblies 12 that have a first structural element 16 that is a composite material (e.g. CFRP) and a second structural element 18 that is a metallic material, the CGF 24 is applied only to the sidewall 22 of the first hole portion 48 of the first structural member 16 where the CFRP is located.

The CGF 24 is made from a low melting alloy ("LMA") comprised of elements that are compatible with all cross-functional requirements of the desired application, for example an aircraft fuel tank environment. As used herein, the term LMA is defined as alloys having a melting temperature in a range greater than about 140° F. and less than about 400° F., preferably about 170° F. to about 400° F. LMAs suitable for use with the conductive fastening system 10 include alloys of two or more elements of the following: bismuth, indium, tin, nickel and zinc (e.g. INDALOY®). A preferred LMA is a ternary alloy consisting of a mixture of bismuth (preferably more than 50%), indium and tin. Due to its softness, the LMA performs like a solid lubricant making insertion of the fastener 30 easier with lower insertion force for interference fit. Alternatively, instead of LMA, the CGF 24 may be a pure metal having a suitable melting point such as tin or the LMA may be made of any conductive material with electrical conductivity equal to or greater than the electrical conductivity of carbon fiber. The CGF 24 is deposited primarily in the crevices 26 of the sidewall 22 of the hole 20 to create a smooth and flattened conductive surface over the sidewall 20. As such, the thickness of the CGF applied to the sidewall 20 will decrease the diameter of the hole 20, preferably by not more than about 0.0005 inch.

The CGF 24 may be applied to the sidewall 22 of the hole 20 by abrading, injection, spraying, or any other known method for applying a liquid material to a solid surface.

Application of CGF by Abrading

The CGF 24 may be rubbed or mechanically abraded at room temperature against the sidewall 22 of the hole 20 to cause particles of CGF 24 to be abraded and deposited into the crevices 26 in the sidewall 22.

The CGF 24 can be abraded into the sidewall 22 of the hole 20 using any suitable method known in the art. For example, CGF 24 can be abraded onto the sidewall 22 using an apparatus comprising: a support structure; bearings supported by the support structure; a spindle rotatably supported by the bearings; a motor mechanically coupled to the spindle for driving rotation of the spindle; a chuck coupled to the spindle; and a hole coating applicator comprising a shaft made of a material that is not LMA and clamped by the chuck, and a LMA pad that is supported by the shaft and radially movable relative to the shaft. In some coating apparatus, the hole coating applicator may further comprise a flexural element that can bend relative to the shaft due to flexure of a flexural hinge, and the LMA pad is attached to the flexural element. In other apparatus, the hole coating applicator further comprises: a camming surface; a camming block that carries the LMA pad and has an inclined surface in contact with the camming surface; and a spring that exerts an axial spring force on the camming block, wherein the camming surface deflects the camming block to move radially outward when the axial spring force is exerted on the camming block. Other methods and apparatus for abrading CGF 24 to the sidewall 22 of the hole 20 are described in commonly-owned U.S. patent application Ser. No. 15/923,630 entitled "Method, Apparatus and Applicator for Applying a Coating on a Surface of a Lamination," the disclosure of which is incorporated by reference herein in its entirety.

Application of CGF by Injection

The CGF 24 may alternatively be applied to the sidewall 22 of the hole 20 by heating the CGF 24 to a molten state and applying the molten CGF 24 to fill in the crevices 26 in the sidewall 22 of the holes 20 in the areas where CFRP is positioned.

The molten CGF 24 can be injected into the sidewall 22 of the hole 20 using any suitable method that is known in the art. For example, in one implementation, the CGF 24 is heated to a temperature corresponding to the lowest melting point of the CGF 24 (i.e. "eutectic melt temperature") to render the CGF 24 to a molten state. A nozzle having an internal channel system is then inserted into the hole 20. A narrow gap separates the sidewall 22 of the hole 20 from the nozzle. The nozzle is then withdrawn from the hole 20. As the nozzle is being withdrawn, molten CGF 24 is forced into and through the internal channel system and out of a circular circumferential orifice of the nozzle and injected into the gap separating nozzle to coat the sidewall 22 of the hole 20 with molten CGF 24. When the molten CGF 24 solidifies, the resulting CGF coated hole will have a diameter defined by the external diameter of the nozzle. However, the thickness of the LMA applied to sidewall of the hole will decrease the diameter of hole, preferably by not more than about 0.0005 inch. Other methods and apparatus for injecting molten LMA onto the sidewall 22 of hole 20 in CFRP are described in commonly-owned U.S. patent application Ser. No. 15/786,665 entitled "Apparatus and Methods for Injecting Filler Material into a Hole in a Composite Layer", the disclosure of which is incorporated by reference herein in its entirety.

Application of CGF by Spraying

The CGF 24 may also be applied to sidewall 22 of the hole 20 by spraying the CGF 24 onto the sidewall 22 to fill in the crevices 26 in areas of the hole 20 where the CFRP is positioned. With this method, the CGF 24 is a pure metal, preferably nickel or zinc. The spraying of a metal onto a surface is known in the art. Suitable spraying methods include but are not limited to cold spray (also referred to as supersonic particle deposition or gas dynamic cold spray) and thermal spraying (e.g. plasma spraying). In an implementation using cold spray, nickel in the form of a fine powder is accelerated to a very high speed by a carrier gas and forced through a nozzle onto the sidewall 22 of the hole 20 in the areas where the CFRP is positioned. Upon impact, the nickel particles deform plastically and bond mechanically to the sidewall 22 to form a coating. The thickness of the CGF 24 depends on various factors such as the type of metal and method of spraying used. Generally, however, the thickness of the CGF applied to sidewall of the hole will decrease the diameter of hole by not more than about 0.0005 inch.

Checking the Layer of CGF

To ensure that a sufficient amount of CGF 24 is applied to the sidewall 22 of the hole 20, a real-time monitoring system may be employed to verify that the contact resistance is within an acceptable range. Methods to measure contact resistance are known in the art. In one implementation, the monitoring system utilizes a capacitive coupling to measure the effective resistance of the CGF 24 and the random parallel resistance of the carbon fibers 34 in the CFRP layers in the structural assembly 12 in series. A feedback loop is used to control the CGF application process and confirm its completion to a satisfactory resistance level based on the response by the monitoring system. By applying CGF 24 to form a coating in the hole, concurrently measuring the effective resistance of the CGF 24 and carbon fibers 34 in series, and then ceasing application of CGF 24 when a specified effective resistance is achieved, at least a minimum acceptable electrical conductivity at the interface of the hole 20 and fastener 30 can be achieved in the final structural assembly 12. Preferably, the resistance level of the CGF 24 should be within a threshold resistance level that depends on factors such as the thickness of the structural assembly 12 and the size and geometry of the fastener 30. Other methods and apparatus for verifying that the contact resistance is within an acceptable range are described in commonly-owned U.S. patent application Ser. No. 15/923,630, supra, and commonly-owned U.S. patent application Ser. No. 15/923,436 entitled "Systems and Methods for Measuring the Electrical Contact Resistance at an Interface", the disclosures of which are incorporated by reference herein in their entireties.

Assembly

Completion of the construction of the structural assembly 12, i.e., installing the fastener 30 into the hole 20, is performed using methods known in the art. After the hole 20 has been coated with CGF 24, the fastener 30 is inserted into the hole 20 so that the shank 40 passes through the hole 20 with the desired fit (i.e. a clearance fit, a transition fit or an interference fit) and the mating portion 42 extends past a bottom surface 60 of the second structural element 18. A mating part 46 is then coupled to the mating portion 42 to secure the fastener 30 in the hole 20 and the first structural element 16 to the second structural element 18. During installation, a manual rivet gun or automated system can be used to hammer the fastener 30 into the hole 20. The fastener 30 can also be installed using a robotic system to insert and hammer the fastener 30 into the hole 20, and another robot or human affixes the mating part 46 to the mating portion 42 from the other side of the structural assembly 12. When using a blind fastener, the blind fastener is installed into the hole 20 in the structural assembly 12 using methods known in the art.

Although conductive fastening systems 10 having fasteners 30 with a conductive coating 32 and holes 20 in the structural assemblies 12 coated with CGF 24 have been shown and described, modifications may occur to those skilled in the art upon reading the specification. The present application includes such modifications and is limited only by the scope of the claims.

The invention claimed is:

1. A fastening system for an assembly comprising a first structural element made of a carbon fiber reinforced plastic (CFRP) having a first hole and a second structural element having a second hole aligned with the first hole of the first structural element, the fastening system comprising:
   a fastener comprising a head, a mating portion, and a shank extending between the head and the mating portion, at least the mating portion and the shank insertable into the first hole and the second hole;
   an electrically conductive coating formed on the shank of the fastener and having a uniform thickness of about 0.0001 inch to about 0.0006 inch; and
   an electrically conductive gap filler applied to a sidewall of the first hole in the first structural element, the electrically conductive gap filler comprising a low melting alloy (LMA) made from one or more metals selected from the group consisting of bismuth, indium, tin, nickel, zinc, or combination thereof, and having particles that are deposited into crevices in the sidewall.

2. The fastening system of claim 1, wherein the electrically conductive coating is made from one or more conductive metals selected from the group consisting of tin, zinc, indium, bismuth, combinations thereof, or alloys thereof.

3. The fastening system of claim 2, further comprising a lubricating coating formed over the electrically conductive coating having a thickness of less than about 0.0002 inch, the lubricating coating positioned between the electrically conductive coating and the electrically conductive gap filler.

4. The fastening system of claim 1, wherein the LMA has a first melting temperature lower than a second melting temperature of a matrix material of the CFRP.

5. The fastening system of claim 4, wherein the first melting temperature of the LMA is in a range of about 140° F. to 400° F.

6. The fastening system of claim 1, wherein the sidewall of the first hole has an irregular surface, and the electrically conductive gap filler forms a flattened surface over the irregular surface that decreases a diameter of the first hole by less than 0.0005 inch.

7. The fastening system of claim 1, wherein the electrically conductive coating is a tin-zinc-bismuth alloy.

8. The fastening system of claim 1, wherein the electrically conductive coating is a tin-bismuth alloy.

9. An assembly comprising:
a first structural element made of a carbon fiber reinforced plastic (CFRP) having a first hole;
a second structural element having a second hole aligned with the first hole of the first structural element;
a fastener comprising a head, a mating portion, and a shank extending between the head and the mating portion, the shank occupying at least respective portions of the first hole in the first structural element and the second hole in the second structural element, and the mating portion extending beyond the second structural element;
an electrically conductive coating formed on the shank of the fastener and having a uniform thickness of about 0.0001 inch to about 0.0006 inch; and
an electrically conductive gap filler positioned between the shank of the fastener and a sidewall of the first hole in the first structural element, the electrically conductive gap filler comprising a low melting alloy (LMA) made from one or more metals selected from the group consisting of bismuth, indium, tin, nickel, zinc, or combinations thereof, and having particles that are deposited into crevices in the sidewall.

10. The assembly of claim 9, wherein the electrically conductive coating is made from one or more electrically conductive metals selected from the group consisting of tin, zinc, indium, bismuth combinations thereof, or alloys thereof.

11. The assembly of claim 10, further comprising a lubricating coating formed over the electrically conductive coating having a thickness of less than about 0.0002 inch, the lubricating coating positioned between the electrically conductive coating and the electrically conductive gap filler.

12. The assembly of claim 9, wherein the electrically conductive gap filler has a first melting temperature in a range of about 140° F. to about 400° F.

13. The assembly of claim 10, wherein the sidewall of the first hole has an irregular surface, and the electrically conductive gap filler forms a flattened surface over the irregular surface that decreases a diameter of the first hole by less than 0.0005 inch.

14. The fastening system of claim 9, wherein the electrically conductive coating is a tin-zinc-bismuth alloy.

15. The fastening system of claim 9, wherein the electrically conductive coating is a tin-bismuth alloy.

16. The fastening system of claim 9, wherein the LMA has a first melting temperature lower than a second melting temperature of a matrix material of the CFRP.

17. A method for fastening a first structural element made of a carbon fiber reinforced plastic (CFRP) having a first hole and a second structural element having a second hole aligned with the first hole, the method comprising the steps of:
applying an electrically conductive coating to a thickness of about 0.0001 inch to about 0.0006 inch on a shank of a fastener, the shank being positioned between a head and a mating portion of the fastener;
mechanically abrading an electrically conductive gap filler comprising a low melting alloy made from one or more metals selected from the group consisting of bismuth, indium, tin, nickel, zinc, or combinations thereof against a sidewall of the first hole in the first structural element to cause particles of the electricity conductive gap filler to be abraded and deposited into crevices in the sidewall;
inserting at least the mating portion and the shank of the fastener into the first hole of the first structural element and the second hole of the second structural element such that the shank occupies at least respective portions of the first hole and the second hole and the mating portion extends beyond the second structural element.

18. The method of claim 17, wherein the electrically conductive gap filler is applied to flatten jagged edges in a surface of the sidewall of the first hole to create a soft, lubricious interface for installation of the fastener that decreases a diameter of the first hole by less than 0.0005 inch.

19. The method of claim 18, wherein the electrically conductive gap filler is mechanically abraded onto the surface of the sidewall of the first hole at room temperature.

20. The method of claim 17, further comprising concurrently measuring an effective resistance of the electrically conductive gap filler and carbon fibers in the CFRP as the electrically conductive gap filler is applied on the sidewall of the first hole and ceasing application of the electrically conductive gap filler when a specified effective resistance is achieved.

* * * * *